United States Patent
Del Pesco et al.

(10) Patent No.: US 6,479,612 B1
(45) Date of Patent: Nov. 12, 2002

(54) FLUOROCHEMICAL WATER AND OIL REPELLENTS

(75) Inventors: Thomas Wayne Del Pesco, Hockessin, DE (US); Jack Kirchner, Wilmington, DE (US); Andrew H. Liu, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/596,322

(22) Filed: Jun. 19, 2000

Related U.S. Application Data

(60) Provisional application No. 60/148,025, filed on Aug. 10, 1999.

(51) Int. Cl.⁷ .............................................. C08G 18/28
(52) U.S. Cl. ........................ 528/70; 528/71; 524/840; 428/423.4; 428/245.1; 428/425.5; 428/423.5; 428/423.7; 442/80; 442/82
(58) Field of Search ................... 528/70, 71; 428/423.4, 428/425.1, 425.5, 423.5, 423.7; 524/840; 442/80, 82

(56) References Cited

U.S. PATENT DOCUMENTS

| | | | |
|---|---|---|---|
| 3,019,133 A | 1/1962 | Hayden et al. | 117/142 |
| 3,236,372 A | 2/1966 | Shane et al. | 106/287 |
| 3,484,281 A | 12/1969 | Guenthner et al. | 117/121 |
| 3,573,952 A | 4/1971 | Berger | 117/16 |
| 3,951,762 A | 4/1976 | Voss et al. | 204/59 F |
| 4,527,992 A | 7/1985 | Friese et al. | 8/94.21 |
| 4,748,267 A * | 5/1988 | Chang | 560/158 |
| 4,778,915 A | 10/1988 | Llina et al. | 560/29 |
| 4,877,540 A | 10/1989 | Engelhardt et al. | 252/8.75 |
| 5,171,877 A | 12/1992 | Knaup et al. | 560/26 |
| 5,276,175 A | 1/1994 | Dams et al. | 560/27 |
| 5,370,919 A | 12/1994 | Fieuws et al. | 428/96 |
| 5,489,389 A | 2/1996 | Ritter et al. | 252/8.57 |
| 5,548,022 A | 8/1996 | Ito et al. | 524/839 |
| 5,669,964 A | 9/1997 | Kai | 106/2 |
| 5,693,747 A | 12/1997 | Diesenroth et al. | 528/401 |
| 5,714,082 A | 2/1998 | Boardman et al. | 252/8.62 |

FOREIGN PATENT DOCUMENTS

| | | | |
|---|---|---|---|
| DE | 3607773 | 3/1986 | |
| DE | 4423352 A | 4/1997 | C14C/9/00 |
| EP | 0 140 525 B2 | 5/1985 | C14C/9/00 |
| EP | 0 339 862 A | 11/1989 | |
| EP | 0 690 039 A | 1/1996 | |
| EP | 0 717 057 A | 6/1996 | |
| FR | 2 749 309 A1 | 5/1997 | C08G/18/38 |
| JP | 60040182 A | 8/1983 | |
| JP | 03265700 A | 3/1990 | |
| JP | 05214325 A | 2/1992 | |
| JP | 06017034 A | 7/1992 | |
| WO | WO 97/00995 | 6/1996 | D06M/11/79 |
| WO | WO 97/44375 | 5/1997 | C08G/18/62 |

* cited by examiner

Primary Examiner—James J. Seidleck
Assistant Examiner—Melanie Bissett

(57) ABSTRACT

A polymer having at least one urea linkage derived by contacting (1) at least one polyisocyanate, or mixture of polyisocyanates, (2) at least one fluorocarbon alcohol, fluorocarbon thiol or fluorocarbon amine, (3) at least one straight or branched chain alcohol, amine or thiol, and (4) at least one alcohol containing a sulfonic acid group or its salt, and then (5) optionally at least one linking agent useful for imparting oil repellency and water repellency to substrates.

19 Claims, No Drawings

FLUOROCHEMICAL WATER AND OIL REPELLENTS

This application claims the benefit of No. 60/148,025, filed Aug. 10, 1999.

FIELD OF THE INVENTION

This invention relates to fluorochemical compositions which provide oil repellency and water repellency properties to substrates. This invention further relates to a method for imparting oil- and water-repellent properties to various substrates and the resulting treated substrates.

BACKGROUND OF THE INVENTION

The tanning of leather is a complex process described, for instance, in the Kirk-Othmer Encyclopedia of Chemical Technology. Fourth Edition, Volume 15, pp. 159–176. Produced from animal skins, leather is used for many purposes, including shoes, upholstery, clothing, gloves, hats, books, sports equipment, and the like. In most such uses, water repellency is desired and conventionally achieved by the application of fats, or by surface treatment of the leather after drying. The application of fat to the leather does not provide any oil repellency. Oil repellency for leather, and thereby soil repellency, is also a desirable property in most of these uses but is more difficult to produce. Limited oil repellency can be obtained by certain surface coatings after the leather has been dried. Such surface applications to dried leather do not penetrate, or penetrate only to a limited extent, throughout the thickness of the leather and thus do not provide significant oil or water repellency in depth through the thickness of the leather. Consequently, when the leather is cut in the manufacture of articles, or when the surface of finished articles is damaged by abrasion in use, the exposed leather is deficient in oil repellency and soil resistance. Additionally, the post-drying surface finishing of leather is an art in itself, and any coatings must be compatible with the final treatments given to leathers in various uses.

Incorporation of oil repellent materials onto the dried leather hides by spraying or into the hides during the wet stage processing, e.g., during the tanning, retanning, and dyeing baths, is practical and in use in the leather industry. However the leather, after drying and processing to produce the desired repellency, either requires a high temperature cure at about 100° C. or lengthy storage time (about 2 weeks) at room temperature.

A number of treatment processes have been described for improving the water- and oil-repellency of leather, for instance, Diesenroth, et al, in U.S. Pat. No. 5,693,747 describe sulfur-containing diols capable of being reacted with urethanes to make repellent materials. Certain of Deisenroth's compositions contain an organic sulfate group, but do not contain sulfonate groups.

It is desirable to provide fluorochemical oil- and water-repellent formulations that are compatible with the wet stages of leather processing, and that would, after drying and fabrication of finished leather products, provide oil and water repellent properties immediately and without a cure step substantially throughout the thickness of the leather. Furthermore, it is desirable that such bath additives be effective with essentially no changes in the leather processing steps, be compatible with leather treatment bath formulations, and be applied without the need for additional equipment. The present invention provides such a bath additive. Further, such compounds provide oil repellency and water repellency to other substrates.

SUMMARY OF THE INVENTION

The present invention comprises a polymer having at least one urea linkage derived by contacting (1) at least one polyisocyanate, or mixture or polyisocyanates, (2) at least one fluorocarbon alcohol, fluorocarbon thiol or fluorocarbon amine, (3) at least one straight or branched chain alcohol, amine or thiol, (4) at least one alcohol containing a sulfonic acid group or its salt, and then (5) optionally at least one linking agent.

The present invention further comprises a method of imparting oil repellency and water repellency to leather, wood, masonry and textile substrates comprising contacting said substrate with the polymer described above. The present invention further comprises substrates having oil repellency and water repellency treated with a polymer as described above.

DETAILED DESCRIPTION OF THE INVENTION

Trademarks and tradenames are indicated herein by capitalization. The present invention comprises urethane-based polymers that can be applied during the wet treatment, tanning, or bath stage of leather processing, providing oil- and water-repellent properties and soil resistance substantially throughout the thickness of the leather. The dispersions are compatible with conventional leather treatment processes without process changes and are superior to surface coating of treated leather. The polymers are also useful to impart oil repellency and water repellency to wood, masonry and textile substrates.

The urethane-based oil- and water-repellent polymers of the present invention comprise branched polymers having at least one urea linkage per molecule and are derived by contacting (1) at least one polyisocyanate, or mixture of polyisocyanates, which predominately contains at least three isocyanate groups per molecule, (2) at least one fluorocarbon alcohol, fluorocarbon thiol, or fluorocarbon amine, (3) at least one branched or straight chain alcohol, amine, or thiol, (4) at least one alcohol containing a sulfonic acid group or the salt of a sulfonic acid group, and (5) optionally sufficient liking agent to react with all remaining isocyanate groups. These are hereinafter identified as Reactants 1–5. By the term "polyisocyanates" is meant tri- and higher isocyanates and the term includes oligomers.

The polyisocyanate reactant (Reactant 1) provides the branched polymer backbone of the polymer. Any polyisocyanate having predominately three or more isocyanate groups, or any isocyanate precursor of a polyisocyanate having predominately three or more isocyanate groups, is suitable for use in this invention. It is recognized that minor amounts of diisocyanates may remain in such products. An example of this is a biuret containing residual small amounts of hexamethylene diisocyanate. Particularly preferred as Reactant 1 are hexamethylene diisocyanate homopolymers having the structure of Formula 1.

Formula 1

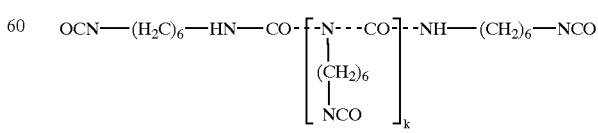

wherein k averages about 1.8. These are commercially available, for instance as DESMODUR N-100 from Bayer Corporation, Pittsburgh Pa. DESMODUR N-100 is a hexamethylene diisocyanate-based polymeric isocyanate containing biuret groups. While individual homopolymers having k=1, 2, etc., are suitable for preparing the polyurethane polymers of the present invention, this specific homopolymer is only available in admixture with substantial amounts (50% or more) of homopolymers having k greater than 1, i.e., substantial amounts of tetra- and higher polyisocyanates.

Also suitable for use as Reactant 1 are hydrocarbon diisocyanate-derived isocyanurate trimers which can be represented by Formula 2.

Formula 2

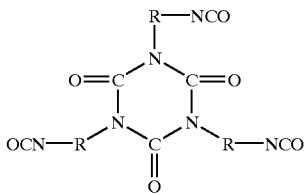

wherein R is a divalent hydrocarbon group, preferably aliphatic, alicyclic, aromatic, or arylaliphatic. For example, R is hexamethylene, toluene, or cyclohexylene, and is preferably hexamethylene, which is available as DESMODUR N-3300 (a hexamethylene diisocyanate-based isocyanurate). Other triisocyanates useful for the purposes of this invention are those obtained by reacting three moles of toluene diisocyanate with 1,1,1-tris-(hydroxymethyl)ethane or 1,1,1-tris-(hydroxymethyl)propane. The isocyanurate trimer of toluene diisocyanate and that of 3-isocyanatomethyl-3,4,4-trimethylcyclohexyl isocyanate are other examples of triisocyanates useful for the purposes of this invention, as is methine-tris-(phenylisocyanate). Precursors of polyisocyanate, such as disocyanate, are also suitable for use in the present invention as substrates for the polyisocyanates.

Preferred polyisocyanate reactants are the aliphatic and aromatic polyisocyanates containing biuret structures. Most preferred is the homopolymer of hexanethylene diisocyanate, DESMODUR N-100.

The fluorocarbon alcohol, fluorocarbon thiol, or fluorocarbon amine (Reactant 2) provides the oil- and soil-repellency and contributes to the water repellency of the polymer. The fluorocarbon alcohol, fluorocarbon thiol, or fluorocarbon amine reactant suitable for use in the present invention has the structure:

$R_f$—X—Y—H wherein
$R_f$ is a $C_4$–$C_{20}$ linear or branched fluorocarbon chain,
X is a divalent linking radical of formula —$(CH_2)_p$— or —$SO_2N(R_1)$—$CH_2CH_2$—, wherein p is 1 to about 20; and $R_1$ is an alkyl of 1 to about 4 carbon atoms; and
Y is —O—, —S—, or —$N(R_2)$— where $R_2$ is H or $R_1$.

More particularly $R_f$ is $C_qF_{(2q+1)}$ wherein q is 4 to about 20, or mixtures thereof. Preferred examples of $R_f$—X— include the following: 1) mixtures of $F(CF_2)_q(CH_2)_n$— wherein q is as previously defined and n is 1 to about 20, and 2) $F(CF_2)_qSO_2N(R_1)CH_2CH_2$— wherein q and $R_1$ are as previously defined. An example of mixture 1) includes the group of formula F(CF2CF2)nCH2CH2OH, wherein n has values selected from 2, 3, 4, 5, 6, 7, 8, 9, and 10, said fluorochemical compounds being present in the proportions shown as compositions (i) or (ii):

| n | Composition by weight % | |
|---|---|---|
| | (i) | (ii) |
| 2 | 0–3 | |
| 3 | 27–37 | 0–3 |
| 4 | 28–32 | 45–52 |
| 5 | 14–20 | 26–32 |
| 6 | 8–13 | 10–14 |
| 7 | 3–6 | 2–5 |
| 8 | 0–2 | 0–2 |
| 9 | 0–1 | 0–1 |
| 10 | 0–1 | 0–1 |

The alcohol, amine, or thiol reactants (Reactant 3) contribute to the water repellency properties of the polymer. The alcohol, amine, or thiol reactant suitable for use herein is a straight chain or a branched alcohol, a straight chain or branched amine, or a straight chain or branched thiol. Primary alcohols are preferred since such alcohols are more readily reacted with the isocyanate groups than secondary or tertiary alcohols for steric reasons. Reactant 3 is a branched alcohol, amine, or thiol, or a mixture of branched and straight chain alcohols, amines, or thiols. Utilizing a proportion of branched chain alcohols, amines, or thiols provides a softer finish, probably by adding to the chain disorder. While the molar ratio of branched chain alcohol, amine, or thiol to straight chain alcohol, amine, or thiol is quiet broad, the molar ratio of branched chain to straight chain is preferably in the range 100:0 to 40:60.

Suitable straight chain alcohols, amines, or thiols have the structure $H(CH_2)_x$—OH, $H(CH_2)_x$—$NH_2$, or $H(CH_2)_x$—SH, wherein x is 12 to 20 and preferably 16 to 18, or mixtures thereof. Particularly preferred is the readily available stearyl alcohol (1-octadecanol) having x=18. Optionally, ethoxylates of alcohols may be used.

Suitable branched chain alcohols, amines, or thiols have the structure $C_yH_{(2y+1)}$—$CH_2$—OH, $C_yH_{(2y+1)}$—$CH_2$—$NH_2$, or $C_yH_{(2y+1)}$—$CH_2$—SH wherein y is in the range 15 to 19, or mixtures thereof. An example is ISOFOL 18T, a mixture of branched chain alcohols comprising 2-hexyl- and 2-octyl-decanol, and 2-hexyl- and 2octyl-dodecanol, available from CONDEA-Vista Co., Houston Tex. Optionally, ethoxylates of alcohols may be used.

The reactant comprising the alcohol containing a sulfonic acid group or its salt (Reactant 4) contributes anionic sites to the product polymer, such that the polymer has self dispersing properties and forms stable aqueous dispersions without added surfactants. The alcohol-sulfonate salt has the structure $MO_3S$—Z—OH wherein
M is an alkali metal; amonium; alkyl, dialkyl, trialkyl, or tetraalkyl ammonium; or hydrogen; and
Z is a straight or branched chain alkyl group containing from about 2 to about 10 carbon atoms, or an aryl or alkylaryl group containing one or more aromatic rings and 6 to about 11 carbon atoms.

Preferred is sodium 2-hydroxyethyl sulfonate, commercially available under the trivial name sodium isethionate. Other examples of such hydroxysulfonic acids are ammonium isethionate, 3-hydroxy-1-propanesulfonic acid and its sodium salt, 4-hydroxybenzene sulfonic acid and its sodium salt, sodium 4-hydroxy-1-naphthalene sulfonate, and sodium 6-hydroxy-2-naphthalene sulfonate.

The alcohol containing a sulfonic acid group or its salt (Reactant 4) is not necessarily fully incorporated into the polyurethane. Thus the amount of the alcohol containing a sulfonic acid group or its salt may be slightly lower than the amount added and the amount of crosslinking by the linking reagent will be higher.

The sulfonic acid groups or their salts used as Reactant 4 are advantageous over the sulfates used in the prior art. The sulfates are hydrolyzed at the low pH ranges used in leather treatments, while the sulfonates are not hydrolyzed at these pH ranges.

If reactants 1 to 4 are not present in sufficient quantities to consume all of the isocyanate groups, the remaining isocyanate groups are reacted with a multi-functional linking agent (Reactant 5), thereby linking two or more isocyanate-terminated molecules together and increasing the molecular weight of the product. Typically, a compound containing a hydroxy group is used as the linking agent. While water is the most commonly used linking agent, other multi-functional compounds such as glycols are also suitable for use herein. When a linking agent other than water is selected, a stoichiometric insufficiency is used, as discussed below. A fluorinated diol is also suitable for use herein, such as the structure of Formula 3.

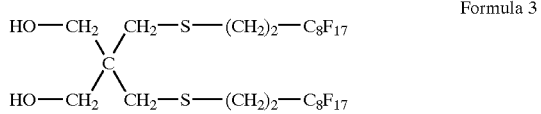

Formula 3

Such a fluorinated diol, clearly, acts a both a linking agent (Reactant 5) and as a fluorocarbon alcohol (Reactant 2). An example of such a diol is LODYNE 941, available from Ciba Speciality Chemicals, High Point, N.C.

The branched polymers of the present invention are prepared in a suitable dry solvent free of groups that react with isocyanate groups. Organic solvents are employed. Ketones are the preferred solvents, and methyl isobutyl ketone (MIBK) is particularly preferred for convenience and availability. A small proportion of a solubilizing aid such as dimethylformamide, dimethylacetamide, or N-methylpyrrolidone (e.g., 10% of the solvent) increases the solubility of the sodium hydroxysulfonate and is optionally used if incorporation of the hydroxysulfonate is too slow or is incomplete. The reaction of the alcohols with the polyisocyanate is optionally carried out in the presence of a catalyst, such as dibutyltindilaurate or tetraisopropyltitanate, typically in an amount of about 0.1–1.0%. A preferred catalyst is dibutyltindilaurate.

The ratio of reactants on a molar basis per 100 isocyanate groups is shown in Table 1 below:

TABLE 1

Reactant Ratios (as mole % based on total available isocyanate groups in Reactant 1)

| Reactant | from | to | Preferably from | to |
|---|---|---|---|---|
| Fluoroalcohol or fluorothiol (Reactant 2) | 28 | 48 | 33 | 43 |
| Alcohol, amine, or thiol (Reactant 3) | 28 | 48 | 33 | 43 |
| Hydroxysulfonic acid or salt thereof (Reactant 4) | 1 | 20 | 3 | 5 |
| Total reactants less linking agent | 70 | 100 | 75 | 85 |

Thus the linking agent is 0 to 30, preferably 15 to 25. The ratio of straight and branched alcohols, amines, or thiols is as previously specified above in the description of Reactant 3.

Since the equivalent weights of Reactants 1–4 vary according to the specific reactants chosen, the amounts are necessarily calculated in molar ratios. Examples of specific polymer compositions showing weight ratios are shown in Table 2 using the various fluoroalcohol homologue distributions shown in Table 3.

TABLE 2

Weight Proportions of Polymer Reactants

| Component | Case 1 g(mole %) | Case 2 g(mole %) | Case 3 g(mole %) |
|---|---|---|---|
| Reactant 1, 62.7 g DESMODUR N-100 with 21.1% —NCO in each Case. | | | |
| Reactant 2, Fluoroalcohol | | | |
| as Distribution 1 in Table 3 below, or | 61.87 (40) | 58.78 (38) | 46.40 (30) |
| as Distribution 2 in Table 3 below, or | 56.17 (40) | 53.37 (38) | 42.13 (30) |
| as Distribution 3 in Table 3 below | 67.01 (40) | 63.65 (38) | 50.25 (30) |
| Reactant 3, Hydrocarbon Alcohols | 23.88 (28) | 32.40 (38) | 39.22 (46) |
| Reactant 4, Isethionic Acid | 0.93 (2) | 1.87 (4) | 9.34 (20) |
| Molar Total, Reactants 2–4 | (70) | (80) | (96) |

TABLE 3

Weight Distributions and Equivalent Weights of Fluoroalcohols of Formula F—$(CF_2$—$CF_2)_n$—$CH_2$—$CH_2$—OH used in Table 2

| n | Distribution 1 | Distribution 2 | Distribution 3 |
|---|---|---|---|
| 2 | 0.43 | 0.76 | — |
| 3 | 32.46 | 47.38 | 1.92 |
| 4 | 31.86 | 30.92 | 51.93 |
| 5 | 19.23 | 14.00 | 29.34 |
| 6 | 9.86 | 4.96 | 12.08 |
| 7 | 4.11 | 1.55 | 3.45 |
| 8 | 1.55 | 0.38 | 1.04 |
| 9 | 0.48 | 0.05 | 0.24 |
| Effective Fluoroalcohol Equivalent Weight | | | |
| | 490.7 | 445.5 | 531.4 |

A schematic structures of two specific examples of polymers of the present invention are shown in Formulae 4 and 5. The specific structure of Formula 4 is drawn to show the residues of two hexamethylene diisocyanate homopolymers (having k=1, See Formula 1 above), substituted once with Reactant 2, twice with Reactant 3, once with Reactant 4, and then coupled with water as the linking agent (Reactant 5). Actual Reactant ratios as charged are shown in Table 1 and 2. Formula 5 shows the corresponding structure produced when the optional linking step with Reactant 5 is omitted. Formulae 4 and 5 diagrams are intended only to depict the type of linkages present They do not show actual Reactant ratios, all the structures of the various Reactants, complexities such as molecules containing more than two Reactant 1 residues, or the necessary random distribution of Reactants on the Reactant 1 residue.

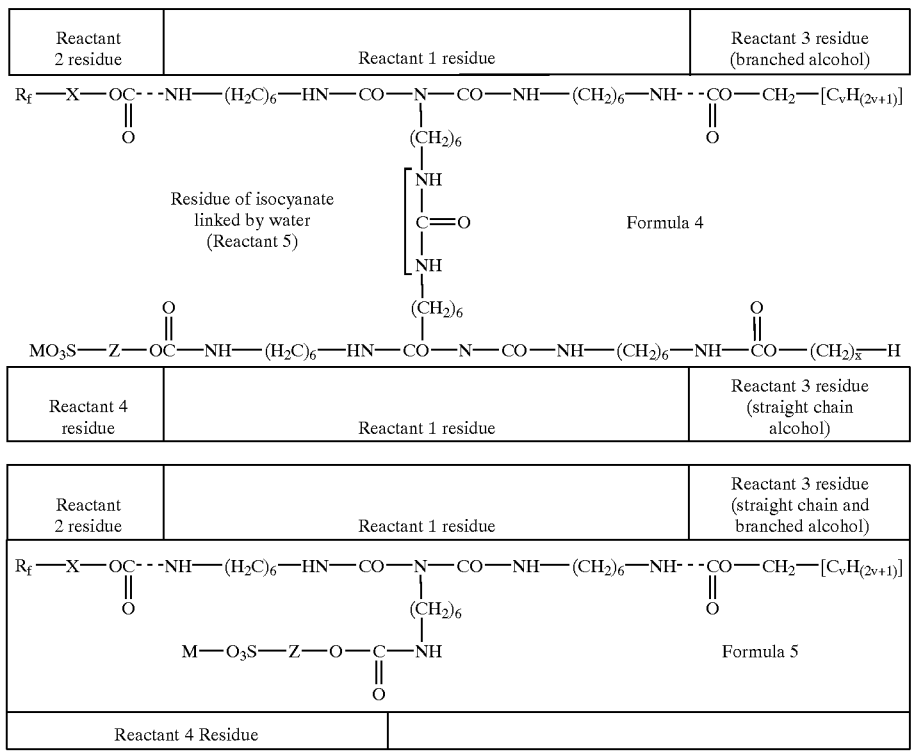

Under rigorously quantitative control, it is possible to prepare the polymers by mixing all the reactants. However, this is not preferred. The preferred and most practical method to prepare the polymers of this invention when reactant 5 is water is first to react Reactants 1–4, and then react the product with an excess of water, thereby avoiding the need for precise measurement of relatively small amounts of water. Similarly, when Reactant 5 is a linking agent other than water, again a stoichiometric deficiency of Reactant 5 is used, such that a small proportion of the isocyanate groups, e.g., 1–2 molar %, remain unreacted. This ensures that no unreacted linking agent remains in the final product. After the linking agent has reacted, a small excess of water is added, ensuring no unreacted isocyanates remain in the final product.

Reactants 1–4 are charged in the desired proportions under dry conditions (for example under dry nitrogen) and typically heated to a temperature of at least about 90° C. for 2 or more hours to complete the reaction. The sum of the reactants can be insufficient to react completely the available isocyanate groups, thus providing a driving force to complete reactions with all the alcohol, amine, or thiol reactants. When this initial reaction with Reactants 1–4 is completed, the linking agent is added if isocyanate groups still remain. When the linking agent is water, an excess is added to react with all remaining isocyanate groups and simultaneously to increase the molecular weight.

The reaction mass, containing solvent but no remaining isocyanate groups, is emulsified in a homogenizer without the addition of emulsifying agent or surfactant. The solvent is stripped from the emulsion by evaporation to provide a polymer dispersion, and the dispersion concentration typically adjusted with water to about 20–40% solids by weight, for convenience in handling. The solids adjustment is made to provide a product dispersion having a fluorine concentration of from about 5 to about 10% by weight. Adjustment of the dispersion concentration is not critical. Lower fluorine concentrations in the dispersion will require the use of larger amounts of the dispersion in treating the substrates to produce the desired fluorine level in the dry substrate described below. Conversely higher fluorine concentrations in the dispersion would require less dispersion in the substrate treatment. Optionally, a dispersant such as WITCONATE AOS is added to the dispersion before it is applied to the leather.

This invention further comprises a method of imparting oil repellency and water repellency to substrates comprising contacting said substrate with the dispersions of the above described polymers. Typically, such contacting is by application of the polymer dispersion to the surface of the substrate.

Suitable substrates for the application of the polymers of this invention are divided into two classes, based on the preferred loading of the polymer onto the substrate. Hereinafter, these are described as "Class A Substrates" or wood, leather, and masonry substrates, and "Class B Substrates" or fibrous substrates. Preferred substrates are Class A Substrates such as leather, wood, pressed or otherwise hardened wood composites, masonry such as stone unglazed porcelain and tile, grout, porous concrete and the like. Suitable substrates for this invention also include blends of Class B Substrates with other fibrous Class B substrates.

"Class B Substrates" are fibers, yarns, fabrics, carpeting, and other articles made from filaments, fibers, or yarns derived from natural modified natural, or synthetic polymeric materials. Specific representative examples of Class B Substrates are cotton, silk, regenerated cellulose, nylon, fiber-forming linear polyesters, fiber-forming polyacrylonitrile, cellulose nitrate, cellulose acetate, ethyl cellulose, and paper.

The current invention is firstly a leather treatment product that is applied by spray onto dry or semi-wet hides or is applied during the wet processing, or after completion, of the normal tanning, retanning or dyeing process. It is well known in the industry that repellency treatments for leather require a heat cure or lengthy storage time to develop fully the oil and water repellency. The heat cure in particular can seriously affect the hand or softness of the leather product. The present invention, in contrast to the prior art, does not require such a heat cure or lengthy storage time to develop the repellency properties. This advantage enables fabrication of the leather article immediately after leather drying and processing and eliminates the storage facilities and delay currently needed for development of the functional leather properties. Leather treated with the compositions of the present invention has a "hand" or softness virtually indistinguishable from the untreated leather. Repellency treatments of the prior art are characterized by a deteriorated hand. "Hand" or softness of finished leather is a subjective quality, conventionally measured by a panel, members of which are unaware of the identity of the sample being evaluated. Such evaluation techniques are well known to those skilled in the art.

The manufacture of leather provides special opportunities to combine the application of the polymer dispersion with the manufacturing process. During the final stages of leather manufacture, after the tanning steps, the wet leather is typically washed with water in a drum. In the practice of this invention, the water in the drum is adjusted to pH 3.5–4.0 with formic acid or ammonium hydroxide and a temperature of 35–40° C. The fluorocarbon dispersion prepared as above is added in an amount sufficient to provide a typical fluorine content of 3–6% based on the finished dry weight of the leather. The leather and dispersion are tumbled for about 0.5–2.0 hours, then the pH is adjusted with formic acid to 3.2–3.5. Tumbling is continued for 10–30 minutes, the wash liquid drained, the leather optionally rinsed, and dried. The higher pH range causes the leather to swell, the lower pH reverses the swelling. The leather may be dried at ambient temperature overnight at typical room temperatures of 65–75° F. (18–24° C.) or with mild heat to accelerate the drying process. No heat curing step is required. Subsequent softening treatments such as staking and dry milling are performed conventionally.

It will be readily recognized by those skilled in the art of leather preparation that many variations of the final stages of leather treatment are practiced and the description above is provided as an example and is not intended to limit the application of the fluorocarbon dispersion to leather. For instance, the range of 3–6% based on the weight of the leather may need to be reduced for thin leathers and increased for thick leathers. Additionally, leather types vary due to source and treatment. In practice, the drum concentration of the dispersion will be adjusted to the amount sufficient and necessary to provide the levels of oil and water repellency and soil resistance required for the particular type of leather being treated and its end use.

The amount of polymer dispersion applied to the leather is an amount sufficient to provide a dry leather containing at least 0.2, and preferably 0.2–20 g fluorine/m$^2$, more preferably 0.2 to 2.3 g fluorine/m$^2$. Higher loadings increase cost without significant improvements in repellency. The fluorine content of the polymer is known by calculation based on the synthesis, or by analysis of the polymer. Application levels to other Class B Substrates are the same.

The self-dispersing fluorochemical polymeric dispersions of the present invention allow for the treatment of leather in the tanning process. The compositions uniquely combine hydrocarbon, branched hydrocarbon, fluorocarbon and sulfonic acid moieties into a polymer with a branched urethane backbone. These compositions need no external surfactants for dispersion stability, are compatible with the leather treatments, requiring no heat curing or aging for performance, and develop the desired water- and oil-repellency during the conventional ambient temperature drying of the leather. Additionally, the ability to add the dispersion during the wet treatment stage of the leather preparation permits the treatment to be effective substantially throughout the leather thickness, as opposed to surface treatments of the finished leather. Thus water- and oil-repellency is retained when the leather is cut during fabrication, or when the leather surface is damaged or abraded in use.

The polymers of the current invention are, secondly, polymers for treating Class B Substrates wherein the oil and water repellent properties of the coated fibrous substrate develop when the conventional high temperature cure is replaced with a low temperature cure. By the term "high temperature cure" is meant conventional curing at about 165° C. By the term "low temperature cure" is meant a curing at between ambient temperature and 160° C.

It should be understood that curing temperatures above the low temperature cure range will also cause the oil- and water-repellency to develop on Class B Substrates. Similarly, the use of elevated temperatures for drying or pressing will also allow oil- and water-repellency to recover. However, the option of the low temperature cure provides a number of advantages. Dye retention is improved and consequently dye use is reduced, energy is saved in the curing step, productivity and dimensional stability of the fibrous substrate are improved, yellowing caused by heat is reduced, and, when the curing is in gas-fired ovens, exposure to nitrogen oxide (NOx) and the resultant discoloration is reduced.

The polymer dispersions are applied to fibrous Class B Substrates, including but not limited to woven and non-woven fabrics made from polyamides, polyesters, polyolefins, cotton, wool, silk, rayon, and mixtures of such fiber compositions, by conventional methods such as padding, spraying, foam, and dipping. The polymer dispersions are also coapplied simultaneously or sequentially with stainblockers, softeners, wetting agents, antistats, and permanent press aids.

The amount of polymer dispersion applied to the Class B Substrate surface is an amount sufficient to provide at least 200 and preferably 200–5,000 parts per million by weight ($\mu$/g) of fluorine based on the weight of the dry fibrous substrate. Higher loadings increase cost without significant improvements in repellency.

When applied to such Class B Substrates, a low temperature cure of about 120° C. is used to set the coating on the fibers and develop the desired repellency properties. While conventional high temperature curing at about 165° C. will develop the desired surface repellency, the high temperature cure can be avoided. The greatly reduced cure temperature provides a number of advantages. Dye retention is improved consequently dye use may be reduced, energy is saved in the curing step, productivity and dimensional stability of the fabric are improved, yellowing caused by heat is reduced, and, when the curing is in gas-fired ovens, exposure to nitrogen oxide (NO$_x$) and the resultant discoloration is reduced.

Alternatively, the polymer dispersions of this invention are applied topically to Class A and Class B Substrates, including carpets, curtains, upholstery fabrics, clothing, wood, masonry, and dry or semi-wet leather by conventional methods such as spraying, padding, or swabbing.

The oil and water repellency ratings give a measure of the theoretical ability of the surface treatment to prevent water and oil from wetting the substrate surface. Test Methods 1 and 2 are generally used to test treated Class A Substrate samples. The tests are basically very similar to Test Methods 3 and 4 for Class B Substrate sample, with slight variations to accommodate the different sample characteristics. Since the surface properties of substrates vary substantially within the Classes, the selection of Test Method is resolved by applying a drop of water to the untreated substrate surface and observing the drop for 30 seconds. If the drop is absorbed (fibrous substrates, porous surfaces such as unglazed ceramics), test the treated substrate by Test Methods 3 and 4. Penetration or wetting of the tested surface indicates failure for that test liquid, otherwise the test is passed for that test liquid. If the water drop in this screening test is not absorbed, as will occur with leather, non-porous stone, etc., test the treated substrate by Test Methods 1 and 2.

Test Method 1. Oil Drop Rating Test for Class A Substrates

The water or oil repellency rating of the leather is the highest-numbered test liquid that will not wet the substrate within a period of 30 seconds. A darkening of the substrate at the liquid-substrate interface while the drop is present on the surface normally evidences wetting of the substrate. This test is intended to measure the intrinsic repellency of the substrate surface and not to simulate actual wear performance in the field.

Beginning with the lowest-numbered test liquid identified in Table 4 below, 3 small drops are placed (approximately 5 mm in diameter or 0.05 mL volume) on the surface of the substrate in several locations. The drops are observed for 30 seconds from approximately a 45 degree angle. If the oil does not wet the surface around the edge of the drop and the drop maintains the same contact angle, a drop of the next higher-numbered test liquid is placed at an adjacent site on the surface and again observed for 30 seconds.

This procedure is continued until one of the test liquids shows obvious wetting of the surface under or around the drop within 30 seconds, or until the drop fails to maintain the same contact angle between the surface and the drop. The oil repellency rating of the substrate is the highest-numbered test liquid that will not wet the surface within a period of 30 seconds.

TABLE 4

Oil Repellency Test Liquids
Oil Drop Rating (test oils)

| Test oil # | Composition |
|---|---|
| 1 | NUJOL mineral oil |
| 2 | 65:35 NUJOL:n-hexadecane* |
| 3 | n-hexadecane |
| 4 | n-tetradecane |
| 5 | n-dodecane |
| 6 | n-decane |

NUJOL is a mineral oil available from Schering-Plough, Memphis TN.
*Composition by volume at 21° C.

Test Method 2. Water Drop Rating Test for Class A Substrates

Drops of standard test liquids are placed on the substrate surface and observed for wetting and contact angle. The compositions of the aqueous test liquids are shown in Table 5 below. The water repellency rating, is the highest-numbered test liquid that does not wet the substrate surface using the evaluation methods above.

Beginning with the lowest-numbered test liquid, 3 small drops are placed on the substrate surface in several locations. The drops are observed for 30 seconds from approximately a 45 degree angle. If the water does not wet the substrate around the edge of the drop and the drop maintains the same contact angle, a drop of the next higher-numbered test liquid is placed at an adjacent site on the substrate and again observed for 30 seconds.

This procedure is continued until one of the test liquids shows obvious wetting of the substrate under or around the drop within 30 seconds, or until the drop fails to maintain the same contact angle between the substrate surface and the drop. The water repellency rating of the substrate is the highest-numbered test liquid that will not wet the substrate within a period of 30 seconds.

TABLE 5

Water Repellency Test Liquids
Water Drop Rating (test solns.)

| Test Soln. # | Water/ Isopropanol (% Vol.) | Surface Tension Dynes/cm at 24° C. |
|---|---|---|
| 1 | 98/2 | 59.0 |
| 2 | 95/5 | 50.0 |
| 3 | 90/10 | 42.0 |
| 4 | 80/20 | 33.0 |
| 5 | 70/30 | 27.5 |
| 6 | 60/40 | |

Test Method 3. Oil Repellency for Class B Substrates

The treated Class B Substrate samples were tested for oil repellency by a modification of AATCC standard Test Method No. 118, conducted as follows. A sample, treated with an aqueous dispersion of polymer as previously described, is conditioned for a minimum of 2 hours at 23° C.+20% relative humidity and 65° C.+10% relative humidity. A series of organic liquids, identified above in Table 4, are then applied dropwise to the samples. Beginning with the lowest numbered test liquid (Repellency Rating No. 1), one drop (approximately 5 mm in diameter or 0.05 mL volume) is placed on each of three locations at least 5 mm apart The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the substrate is the highest numbered test liquid for which two of the three drops remained spherical to hemispherical, with no wicking for 30 seconds.

Test Method 4. Water Repellency for Class B Substrates

The water repellency test determines the resistance of a treated substrate to wetting by aqueous liquids. Drops of water-alcohol mixtures of varying surface tensions are placed on the substrate and the extent of surface wetting is determined visually. The test provides a rough index of aqueous stain resistance. The higher the water repellency rating, the better the resistance of a finished substrate to staining by water-based substances. The composition of standard test liquids is shown in Table 5 above.

Materials

The following materials were used in the examples hereinafter.

18-CROWN-6 is 1,4,7,10,13,16-hexaoxacyclooctadecane, available from Aldrich, Milwaukee, Wis.

DESMODUR N-100 and DESMODUR N-3300 contain hexamethylene diisocyanate homopolymers, the latter having a cyclic structure. Both are available from Bayer Corporation, Pittsburgh Pa.

ISOFOL 18T and 18E are mixtures of branched chain alcohols comprising 2-hexyl- and 2-octyl-decanol, and 2-hexyl- and 2-octyl-dodecanol, available from CONDEA-Vista Co., Houston Tex.

LODYNE 941 is a fluorinated diol of the structure $(HOCH_2)_2C(CH_2SCH_2CH_2R_f')_2$ where $R_f'$ is a perfluroroalkyl group, and LODYNE 921B is a thiol of the structure $F(CF_2CF_2)_nCH_2CH_2SH$ where n is 2–5. Both are available from Ciba Specialty Chemicals, High Point, N.C.

NUJOL is a mineral oil available from Schering-Plough, Inc., Memphis, Tenn.

WITCONATE AOS and WITCONATE AOK are anionic surfactants containing $C_{14}$–$C_{16}$-alkanehydroxy- and $C_{14}$–$C_{16}$-alkene sulfonic acids as the sodium salts, available from Witco Chemical Corp., Houston Tex.

TOLONATE HDB is a biuret of hexamethylene diisocyanate available from Rhodia Co., Cranberry N.J.

ZONYL BA is mixed 1,1,2,2-etrahydroperfluoro-1-alkanols, predominately C8, C10, C12, and C14 with small amounts of C6, C16, and C18, available from E. I. du Pont de Nemours and Company, Wilmington Del.

Perfluorooctanesulfamido alcohol is a fluorinated alcohol available as Fluorad FC-10 from Minnesota Mining and Manufacturing, St. Paul Minn.

MIBK is methylisobutylketone.

EXAMPLES

Examples 1–13 and Comparative Examples A and B

A flask was charged with 99.98 g of a solution of 62.7% by weight DESMODUR N-100 (a hexamethylene diisocyanate prepolymer available from Bayer Corporation, Pittsburgh Pa.) in methyl isobutylketone, MIBK, (calculated 320 mmol-NCO), 14.68 g dimethylformamide, 1.94 g isethionic acid (13 mmol), 16.77 g stearyl alcohol (61 mmol), 16.76 g ISOFOL 18T (61 mmol), and 57.68 g ZONYL BA (mixed 1,1,2,2-tetrahydroperfluoro-1-alkanols, predominately C8, C10, C12, and C14 with small amounts of C6, C16, and C18, available from E. I Du Pont de Nemours and Company, Wilmington, Del., 122 mmol). With stirring, this mass was heated to 48° C. and a solution of approximately 0.027 g dibutyltindilaurate in 1–2 mL of MIBK was added to the flask. The temperature of the reaction spontaneously rose to 76° C. from the heat of reaction. The reaction mass was then further heated to 90° C. and maintained at that temperature for 21–22 hours. After the addition of 2.33 g of deionized water to consume the remaining isocyanate functional groups and 104.41 g of MIBK, the reaction mass was held at 75° C. for 3 hours. This initial product was then emulsified with 408.15 g of deionized water, and the MIBK and some of the water was removed by distillation to give 477 g of a dispersion product that was determined to be 29.9% solids. This basic procedure with variations of the reactants was used to make the dispersions of Examples 2–13 and Comparative Examples A and B as shown in Table 6 below.

Examples 14–20 and Comparative Example D

A flask was charged with 33.35 g of a solution of 62.7% by weight DESMODUR N-100 (a hexamethylene diisocyanate prepolymer available from Bayer Corporation, Pittsburgh Pa.) in methyl isobutylketone, MIBK, (calculated 105.1 mmol-NCO), 0.65 g isethionic acid (4.4 mmol), 5.48 g stearyl alcohol (20.3 mmol), 5.47 g ISOFOL 18T (20.2 mmol), and 19.59 g ZONYL BA (mixed 1,1,2,2-tetrahydroperfluoro-1-alkanols, predominately C8, C10, C12, and C14 with small amounts of C6, C16, and C18, available from E. I DuPont de Nemours and Company, Wilmington Del., 40.0 mmol). With stirring, this mass was heated to 48° C. and a solution of approximately 0.0084 g dibutyltindilaurate in 1–2 mL of MIBK was added to the flask. The temperature of the reaction spontaneously rose and was then further heated until the solvent starts to reflux (~138° C.) The reaction mass was heated to maintain reflux for 21–22 hours. After the addition of 0.70 g of deionized water to consume the remaining isocyanate functional groups and 34.91 g of MIBK, the reaction mass was held at 75° C. for 3 hours. This initial product was then emulsified via sonnication with 136.41 g of deionized water, and the MIBK and some of the water was removed by distillation to give 148 g of a dispersion product that was determined to be 33.2% solids. This basic procedure with variations of the reactants was used to make the dispersions of Examples 15–20 and Comparative Example D as shown in Table 6 below. In addition, the variations detailed below were employed.

Example 16

The amount of Witconate AOK used was calculated based on an assumed molecular weight of 300 and hydroxy content of 40%. To dry this material, water was removed by azeotropic distillation with MIBK.

Example 18

ISOFOL 18E was used in place of ISOFOL 18T.

Example 19

An ethoxylated version of ISOFOL 18T in which an average of about 10 ethylene oxide units were incorporated (ISOFOL 18T/lOEO) was used in place of ISOFOL 18T. In addition, the aqueous dispersion produced by the removal of MIBK was diluted with 300 grams of water.

Example 20

A homogenizer was used to generate the emulsion prior to removal of MIBK.

Comparative Example D

No sulfonic acid groups was incorporated into the polymeric material. WITCONATE AOK (approximately 6% of the polymer mass) was added as a surfactant just prior to generation of emulsion.

TABLE 6

Polymer Compositions

| Ex # | Reactant 1 Cmpd | Reactant 2 Cmpd | Mole % | X | Mole % | Reactant 3 Mole % | Reactant 3 Cmpd | Mole % | Reactant 5 Cmpd | Mole % | Solubilizing Aid | Final Product % F in dispersion | % Solids |
|---|---|---|---|---|---|---|---|---|---|---|---|---|---|
| 1a | N-100 | ZBA | 38 | O | 19 | 19 | Na Is | 4 | Water | 20 | DMF | 7.3 | 29.9 |
| 1b | N-100 | ZBA | 37.4 | O | 19.7 | 19.7 | Na Is | 4.2 | Water | 19.0 | DMF | 7.9 | 30.5 |
| 2a | N-100 | ZBA | 38 | O | 19 | 19 | Na Is | 4 | Water | 20 | NMP | 6.6 | 26.8 |
| 2b | N-100 | ZBA | 37.2 | O | 19.6 | 19.4 | Na Is | 4.2 | Water | 19.6 | NMP | 8.5 | 32.7 |
| 3 | N-100 | ZBA | 37.3 | O | 19.7 | 19.7 | Na Is | 4.1 | Water | 19.2 | DMAc | 7.5 | 28.8 |
| 4 | N-100 | ZBA | 37.6 | O | 19.8 | 19.9 | Na Is | 4.2 | LD | 18.6 | DMAc | 13.8 | 36.5 |
| 5 | N-100 | 921B | 38.4 | O | 19.6 | 19.6 | Na Is | 4.2 | Water | 18.1 | DMAc | 7.1 | 28.5 |
| 6 | N-100 | ZBA | 37.3 | NH | 19.7 | 19.7 | Na Is | 4.3 | Water | 19.0 | DMAc | 7.9 | 30.5 |
| 7 | N-100 | ZBA | 37.4 | O | 19.7 | 19.7 | Na Is | 4.2 | Water | 19.1 | 18C6 | 7.6 | 29.3 |
| 8 | HDB | ZBA | 38 | O | 19 | 19 | Na Is | 4 | Water | 20 | DMF | 6.2 | 25.1 |
| 9 | N-100 | ZBA | 38 | O | 19 | 28 | Na Is | 4 | Water | 11 | DMF | 5.7 | 25.0 |
| 10 | N-100 | ZBA | 38 | O | 20 | 19 | Na Is | 8 | Water | 15 | DMF | 6.9 | 29.2 |
| 11 | N-100 | ZBA | 38 | O | 19 | 19 | Na Is | 12 | Water | 12 | DMF | 6.8 | 29.7 |
| 12 | N-100 | ZBA | 38 | O | 0 | 38 | Na Is | 8 | Water | 16 | DMF | 6.3 | 25.9 |
| Dispersed with 3% (Ex. 13a) and 6% (Ex. 13b) added Witconate AOS-40 on weight of polymer: ||||||||||||||
| 13a | N-100 | ZBA | 38 | O | 19 | 19 | Na Is | 4 | Water | 20 | DMF | 7.1 | 28.8 |
| 13b | N-100 | ZBA | 38 | O | 19 | 19 | Na Is | 4 | Water | 20 | DMF | 6.6 | 26.8 |
| 14 | N-100 | ZBA | 38.1 | O | 19.3 | 19.2 | NaIs | 4.2 | Water | 19.2 | None | 8.9 | 33.2 |
| 15 | N-100 | FC-10 | 39.0 | O | 19.1 | 19.3 | NaIs | 4.0 | Water | 18.6 | None | 7.9 | 35.3 |
| 16 | N-100 | ZBA | 38.0 | O | 19.1 | 19.0 | AOK | 4.0 | Water | 19.9 | None | 7.6 | 31.3 |
| 17 | N-100 | ZBA | 38.1 | O | 12.7 | 25.4 | NaIs | 4.1 | Water | 19.7 | None | 9.0 | 35.5 |
| 18 | N-100 | ZBA | 38.1 | O | 19.1 | 19.2* | NaIs | 4.1 | Water | 19.5 | None | 8.6 | 32.8 |
| 19 | N-100 | ZBA | 38.0 | O | 19.1 | 19.1** | NaIs | 4.0 | Water | 19.8 | None | 2.6 | 12.4 |
| 20 | N-100 | ZBA | 38 | O | 19 | 19 | NaIs | 4 | Water | 20 | None | 6.7 | 27.3 |
| Comparative Examples ||||||||||||||
| A | N-100 | ZBA | 38 | O | 38 | 0 | Na Is | 8 | Water | 16 | DMF | 7.6 | 31.4 |
| B | N-100 | ZBA | 76 | O | 0 | 0 | Na Is | 8 | Water | 16 | DMF | 11.8 | 31.0 |
| D | N-100 | ZBA | 40.1 | O | 20.1 | 20.0 | None | 0 | Water | 19.8 | None | 8.5 | 35.4 |

*ISOFOL 18E
**ISOFOL 18T/10EO

Abbreviations in Table 6
18C6: 18-Crown-6 (See Materials)
921B: LODYNE 921B (See Materials)
DMAC: N,N-dimethylacetamide
DMF: N,N-dimethylformamide
HDB: TOLONATE HDB (See Materials)
LD: LODYNE 941 (See Materials)
N-100: DESMODUR N-100
Na Is: Sodium isethionate
AOK Witconate AOK
NMP: N-methylpyrrolidone
ZBA: ZONYL BA (See Materials)
FC-10 Perfluorooctanesulfamido alcohol Examples 1–13 and Comparative Examples A–C Application of the Fluorochemical Dispersions A LAUNDER-OMETER machine, an automated dyeing machine available from Atlas Electric Device Co. Chicago Ill., was used to apply each polymer dispersion to leather samples. Distilled water was used throughout the application procedure. Leather samples were cut with a stamp, each having a dry weight of about 5 g.

The leather sample was first soaked in water adjusted to pH 4 with 5% formic acid solution until fully wet, usually about 2 hours. The sample was stirred briefly and the pH readjusted to 4 after one hour. A LAUNDER-OMETER tube was charged with 20 cc water. The required amount of the polymer dispersion was weighed, diluted with 20 cc distilled water and the diluted polymer dispersion was added to the LAUNDER-OMETER tube.

The leather sample was removed from the pH 4 soak. Without allowing the leather to dry, a slit rubber stopper was placed on one corner of the leather sample. The slit stoppers were used to weight the leather sample so that it repeatedly sank through the liquid in the tumbling LAUNDER-OMETER tube. The leather sample and stopper were placed into the tube precharged with the diluted polymer dispersion. The tube was closed securely, shaken vigorously for 20 sec., and run in the LAUNDER-OMETER for 1 hour at 400° C. The liquid in the tube was poured off, leaving the leather sample and the attached stopper in the tube, 50 cc distilled water was added and the tube shaken vigorously 10 seconds. The rinse water was drained off. 30 cc distilled water was added to the leather sample in the tube and 5 cc of 5% formic acid solution was added. The tube was returned to the LAUNDER-OMETER and the machine run at 40° C. for 30 min. The formic acid solution was drained. The sample was rinsed and drained as before with 50 cc water. The leather sample was removed and hung to dry for at least 16 hours. Longer drying did not affect the results.

The dried leather sample was stretched in both directions. The water and oil repellency ratings were measured as described above in Test Methods 1 and 2. The resulting data are shown in Table 7.

Examples 14–20 and Comparative Examples D–E

Application of the Fluorochemical Dispersions

A LAUNDER-OMETER machine, an automated dyeing machine available from Atlas Electric Device Co. Chicago Ill., was used to apply each polymer dispersion to leather samples. Distilled water was used throughout the application procedure. Leather samples were cut with a stamp, each having a dry weight of about 5 g.

The leather sample was first soaked in water until fully wet, usually about 2 hours. A LAUNDER-OMETER tube was charged with 20 cc water. The required amount of the polymer dispersion was weighed, diluted with 20 cc distilled water and the diluted polymer dispersion was added to the LAUNDER-OMETER tube.

The leather sample was removed from the water soak. Without allowing the leather to dry, a slit rubber stopper was placed on one corner of the leather sample. The slit stoppers were used to weight the leather sample so that it repeatedly sank through the liquid in the tumbling LAUNDER-OMETER tube. The leather sample and stopper were placed into the tube precharged with the diluted polymer dispersion. The tube was closed securely, shaken vigorously for 20 sec., and run in the LAUNDER-OMETER for 1 hour at 40° C. 5 cc of 5% formic acid solution was added. The tube was returned to the LAUNDER-OMETER and the machine run at 40° C. for 30 min. The formic acid solution was drained. The sample was rinsed and drained as before with 50 cc water. The leather sample was removed and hung to dry for at least 16 hours. Longer drying did not affect the results.

The dried leather sample was stretched in both directions. The water and oil repellency ratings were measured as described above in Test Methods 1 and 2. The resulting data are shown in Table 7.

TABLE 7

Test Results on Finished Leather after Drying at Ambient Temperature

|  | Product | | Before Formic Acid Treatment | | After Formic Acid Treatment | |
| --- | --- | --- | --- | --- | --- | --- |
| Ex. # | % F | g | Water Drop Score Test Method #2 | Oil Drop Score Test Method #1 | Water Drop Score Test Method #2 | Oil Drop Score Test Method #1 |
| 1a | 7.3 | 4.52 | 6 | 6 | 5+ | 6 |
| 1b | 7.9 | 4.18 | 5 | 5 | 5 | 5 |
| 2a | 6.6 | 5.00 | 5 | 5+ | 5 | 5 |
| 2b | 8.5 | 3.88 | 4 | 5 | 5+ | 4 |
| 3 | 7.5 | 4.40 | 5 | 5 | 4 | 5 |
| 4 | 13.8 | 2.39 | 5 | 3+ | 5 | 4 |
| 5 | 7.14 | 4.62 | 5+ | 2 | 5 | 2 |
| 6 | 7.92 | 4.17 | 5 | 2 | 5+ | |
| 7 | 7.61 | 4.34 | 5 | 6 | 5 | 6 |
| 8 | 6.2 | 5.32 | 5 | 5 | 5 | 5 |
| 9 | 5.7 | 5.79 | 4 | 4 | 5 | 4 |
| 10 | 6.9 | 4.78 | 5 | 5 | 5 | 4+ |
| 11 | 6.8 | 4.85 | 5 | 3 | 5 | 4 |
| 12 | 6.3 | 5.24 | 4 | 0 | 5 | 5 |
| 13a | 7.1 | 4.65 | 5 | 5 | 5 | 5 |
| 13b | 6.6 | 5.00 | 5 | 5 | 6 | 5 |
| 14 | 8.9 | 3.71 | — | — | 6 | 5 |
| 15 | 7.9 | 4.16 | — | — | 5 | 5 |
| 16 | 7.6 | 4.34 | — | — | 6 | 6 |
| 17 | 9.0 | 3.65 | — | — | 6 | 5 |
| 18 | 8.6 | 3.81 | — | — | 6 | 5 |
| 19 | 2.6 | 12.6 | — | — | 4 | 4 |
| 20 | 7.0 | 4.71 | — | — | 7 | 6 |

TABLE 7-continued

Test Results on Finished Leather after Drying at Ambient Temperature

|  | Product | | Before Formic Acid Treatment | | After Formic Acid Treatment | |
| --- | --- | --- | --- | --- | --- | --- |
| Ex. # | % F | g | Water Drop Score Test Method #2 | Oil Drop Score Test Method #1 | Water Drop Score Test Method #2 | Oil Drop Score Test Method #1 |
| Comparative Examples | | | | | | |
| A* | 7.6 | 4.34 | 5 | 2 | 5 | 1 |
| B* | dispersion unstable in treatment bath | | | | | |
| C* | — | — | 0–2 | — | 0–2 | 0 |
| D* | 8.5 | 3.89 | — | — | 6 | 4 |
| E* | — | — | — | — | 2 | 0 |

*Comparative Example A was prepared without a branched alcohol (Reactant 3). Comparative Example B was prepared without any hydrocarbon alcohol (Reactant3). Comparative Example C is ZONYL 8230, a prior art repellency treatment for leather (available from E.I. duPont de Nemours and Company; Wilmington, DE), applied to wet leather in the drum as described above, but for which the recommendedheat curing stage was omitted. Comparative Example D did not contain an internal surfactant. The substrate in Comparative Example E was not treated with any additive.

The data in Table 7 show the oil and water repellency ratings for each example and demonstrate the effect of the composition of the polymer and other additives on the oil and water ratings. The reproducibility of the ratings between different batches of treatment polymer is +/− about 0.5 units. The effect of acidification of the treatment bath is also shown for each example.

Acidification of the treatment bath with formic acid resulted in minor increased changes in performance of the treatment in all cases except Example 12. The choice of solubilizing aid used to solubilize the isethionic acid in the preparation of the polymer had little effect on the performance of the product. Examples 1a, 2a, 3, and 7 using N,N,-dimethylformamide, N,N,-dimethylacetamide, N-methylpyrrolidine or 18-crown-6 respectively, all adequately facilitated the incorporation of the alcoholic sulfonic acid salt group into the urethane polymer, as judged by the performance of the resulting dispersions. With minor process adjustments, the solubilizing aid can be omitted (see Table 8, below).

The source of the isocyanate had no detectable impact on performance, (reference Examples 1a and 8). Addition of a surfactant to the dispersion did not have a dramatic effect on oil and water ratings, (Examples 1a vs 13a and 13b). Increasing the fluorine content of the polymer by using a fluorinated diol as the linking agent afforded no enhancements in performance. In fact the oil ratings were lower than expected, (examples 1a vs 4).

While changes in relative ratios of stearyl alcohol:ISO-FOL:isethionic acid, sodium salt:water (within the range specified above) did not greatly alter the water and oil repellency performance of the product, elimination of either of the hydrocarbon alcohols did impact the performance attributes. Thus Example A, prepared without a branched alcohol, shows poor oil repellency performance results, and Example 12, which contained no straight chain alcohol, needed an acidification step in the treatment process to bring about the desired performance attributes.

Replacing the fluoroalcohol with a fluorothiol, (Example 5) or stearyl alcohol, (Example 6), with its amine analogue adversely affected the oil repellency of the product. Increasing the concentration of sodium isethionate beyond the 8%

(Mole, Example 10), reduced the oil ratings (Example 11). Example 11 showed that acidification of the treatment bath can partially restore the oil rating.

Example 21

Application of Polymer Dispersions to Other Substrates

The polymer dispersions of Example 1 were applied topically to stone, wood, paper, leather, polyester, cotton and nylon substrates.

A solution was made by mixing 5 g of the fluorourethane dispersion in 95 g of a 10% aqueous solution of isopropanol and applied to the substrate surface. The treated substrate was dried for 1 to 12 hours at ambient temperature and tested for performance for oil and water repellency using Test Methods 1–4 as appropriate. Test results are shown in Table 8.

TABLE 8

Test Results on Class A Substrates

| Ex. # | Stone | | Wood | | Paper | | Leather | | Polyester | | Cotton | | Nylon | |
|---|---|---|---|---|---|---|---|---|---|---|---|---|---|---|
| | oil | water | oil | water | oil | water | oil | water | oil | Water | oil | water | oil | water |
| Control (no treatment) | 0 | 0 | 0 | 0 | 0 | 0 | 0 | 0 | | | | | | |
| Ex. 1a | 2 | 3 | 5 | 5 | 4 | 5 | 5 | 6 | | | | | | |
| Ex. 1c* | 2 | 3 | 5 | 5 | 4 | 6 | 5 | 6 | 4 | 5 | 3 | 5 | 0 | 4 |

*Example 1c was prepared as Example 1a (see above) except that no DMF was added, the isethionic acid was finely powdered, and the reaction was carried out under reflux of the reaction mass (at about 125–145° C.).

The data in Table 8 demonstrated application of the polymers of this invention to other substrates at ambient temperatures (no heat cure was used). The Table further showed that dimethylformamide (DMF), used to facilitate incorporation of the isethionic acid, is optional if the isethionic acid is finely-divided and the reaction temperature is moderately increased.

What is claimed is:

1. A polymer having at least one urea linkage derived by contacting (1) at least one polyisocyanate, or mixture of polyisocyanates, (2) at least one fluorocarbon alcohol, fluorocarbon thiol or fluorocarbon amine, (3) a straight and branched chain mixture of at least one alcohol, amine or thiol, and (4) at least one alcohol containing a sulfonic acid group or its salt, and then (5) optionally at least one linking agent.

2. The polymer of claim 1 dispersed in water.

3. The polymer of claim 1 wherein the polyisocyanate contains at least three isocyanate groups or is a diisocyanate precursor of a polyisocyanate containing at least three isocyanate groups.

4. The polymer of claim 1 wherein the polyisocyanate is a hexamethylene diisocyanate homopolymer.

5. The polymer of claim 1 wherein the fluorocarbon alcohol, fluorocarbon thiol or fluorocarbon amine is of formula $R_f—X—Y—H$ wherein $R_f$ is a $C_4–C_{20}$ linear or branched fluorocarbon chain, X is a divalent linking radical of formula $—(CH_2)_n—$ or $—SO_2N(R_1)—CH_2CH_2—$ wherein n is 1 to about 20, and $R_1$ is an alkyl of 1 to about 4 carbon atoms, and Y is $—O—$, $—S—$ or $N(R_1)_2$.

6. The polymer of claim 5 wherein $R_f—X—$ is $F(CF_2)_q(CH_2)_n—$ wherein n is 1 to about 20 and q is from about 4 to about 20.

7. The polymer of claim 1 wherein the straight chain alcohol, amine or thiol of component (3) is a formula selected from the group consisting of $H(CH_2)_x—OH$, $H(CH_2)_x—NH_2$, and $H(CH_2)_4—SH$, and a mixture thereof, wherein x is from about 12 to about 20, and the branched chain alcohol, amine or thiol of component (3) is a formula selected from the group consisting of $C_yH_{(2y+1)}CH_2OH$, $C_yH_{(2y+1)}CH_2NH_2$, and $C_yH_{(2y+1)}CH_2SH$, and a mixture thereof, wherein y is from about 15 to about 19.

8. The polymer of claim 1 wherein the alcohol containing a sulfonic acid is of the formula $MO_3S—Y—OH$ wherein M is an alkali metal; ammonium; alkyl, dialkyl, trialkyl or tetraalkyl ammonium; or hydrogen; and Y is a straight or branched chain alkyl group containing 2 to 10 carbon atoms or an aryl or aralkyl group containing an aromatic ring and 6 to 11 carbon atoms.

9. The polymer of claim 1 wherein the linking agent is water, glycol, or a fluorinated diol.

10. The polymer of claim 1 wherein the molar ratio of reactants per 100 isocyanate groups is from about 28 to about 48 for reactant (2), from about 28 to about 48 for reactant (3), from 1 to about 20 for reactant (4), and from about 4 to about 30 for reactant (5).

11. A method of imparting oil repellency and water repellency to a wood, masonry or leather substrate or a fibrous substrate comprising contacting said substrate with a dispersion of a polymer having at least one urea linkage derived by reacting (1) at least one polyisocyanate, or mixture of polyisocyanates, (2) at least one fluorocarbon alcohol, fluorocarbon thiol, or fluorocarbon amine (3) a straight and branched chain mixture of at least one alcohol, amine or thiol, and (4) at least one alcohol containing a sulfonic acid group or its salt, and then (5) optionally at least one linking agent.

12. The method of claim 11 wherein the amount of fluorine contacted with the wood, masonry or leather substrate is from about 0.2 g fluorine/m2 to about 2.3 g fluorine/m2.

13. The method of claim 12 wherein no curing step is employed.

14. The method of claim 11 wherein the amount of polymer contacted with the fibrous substrate is sufficient to provide a fluorine content of at least about 200 µg/g by weight of the dry substrate.

15. A wood, masonry or leather substrate treated to provide oil repellency and water repellency by contacting said substrate with a dispersion of a polymer having at least one urea linkage derived by reacting (1) at least one polyisocyanate, or mixture of polyisocyanates, (2) at one fluorocarbon alcohol, fluorocarbon thiol, or fluorocarbon amine (3) a straight and branched chain mixture of at least one alcohol, amine or thiol, and (4) at least one alcohol containing a sulfonic acid group or its salt, and then (5) optionally at least one linking agent.

16. The substrate of claim 15 treated to provide oil repellency and water repellency which has a fluorine content of at least about 0.2 g fluorine/m2 in the dry substrate.

17. A fibrous substrate treated to provide oil repellency and water repellency by contacting said substrate with a dispersion of a-polymer having at least one urea linkage derived by reacting (1) at least one polyisocyanate, or mixture of polyisocyanates, (2) at least one fluorocarbon alcohol, fluorocarbon thiol, or fluorocarbon amine (3) a straight and branched chain mixture of at least one alcohol, amine or thiol, and (4) at least one alcohol containing a sulfonic acid group or its salt, and then (5) optionally at least one linking agent.

18. The substrate of claim 17 treated to provide oil and water repellency which has a fluorine content of at least about 200 $\mu$g/g by weight of the dry fibrous substrate.

19. The substrate of claim 18 wherein the oil and water repellency is retained after laundering without a subsequent heat treatment.

* * * * *

UNITED STATES PATENT AND TRADEMARK OFFICE
CERTIFICATE OF CORRECTION

PATENT NO. : 6,479,612 B1 Page 1 of 1
DATED : November 12, 2002
INVENTOR(S) : Thomas Wayne DelPesco et al.

It is certified that error appears in the above-identified patent and that said Letters Patent is hereby corrected as shown below:

Column 19,
Line 64, delete "$C_{4\text{-}C20}$ linear" and substitute therefor -- $C_4$-$C_{20}$ linear --.

Column 21,
Line 8, delete "0.2 g fluorine/m2" and substitute therefor -- 0.2 g fluorine/$m^2$ --.

Signed and Sealed this

First Day of July, 2003

JAMES E. ROGAN
*Director of the United States Patent and Trademark Office*